UNITED STATES PATENT OFFICE.

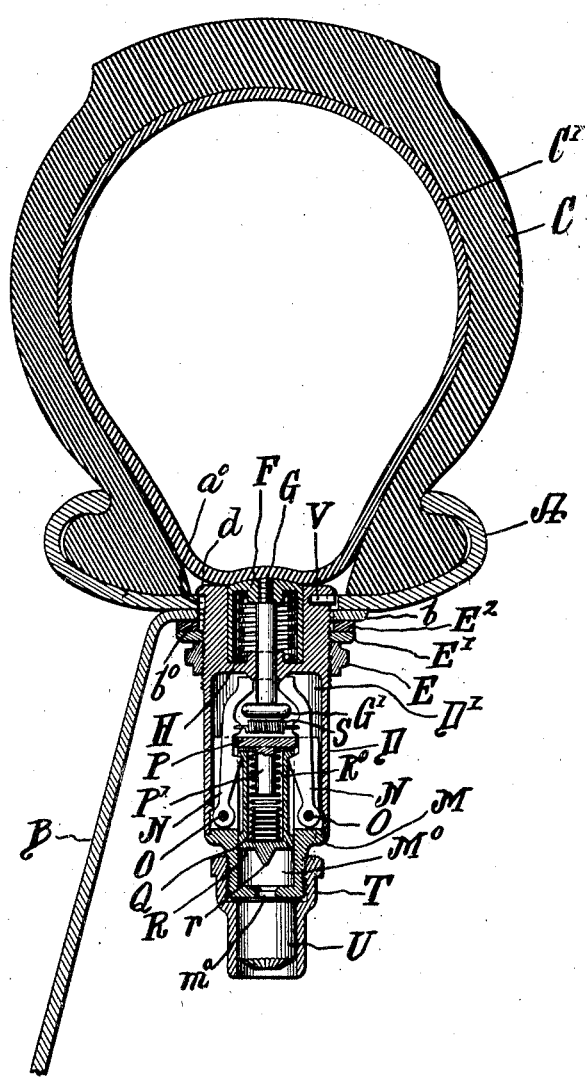

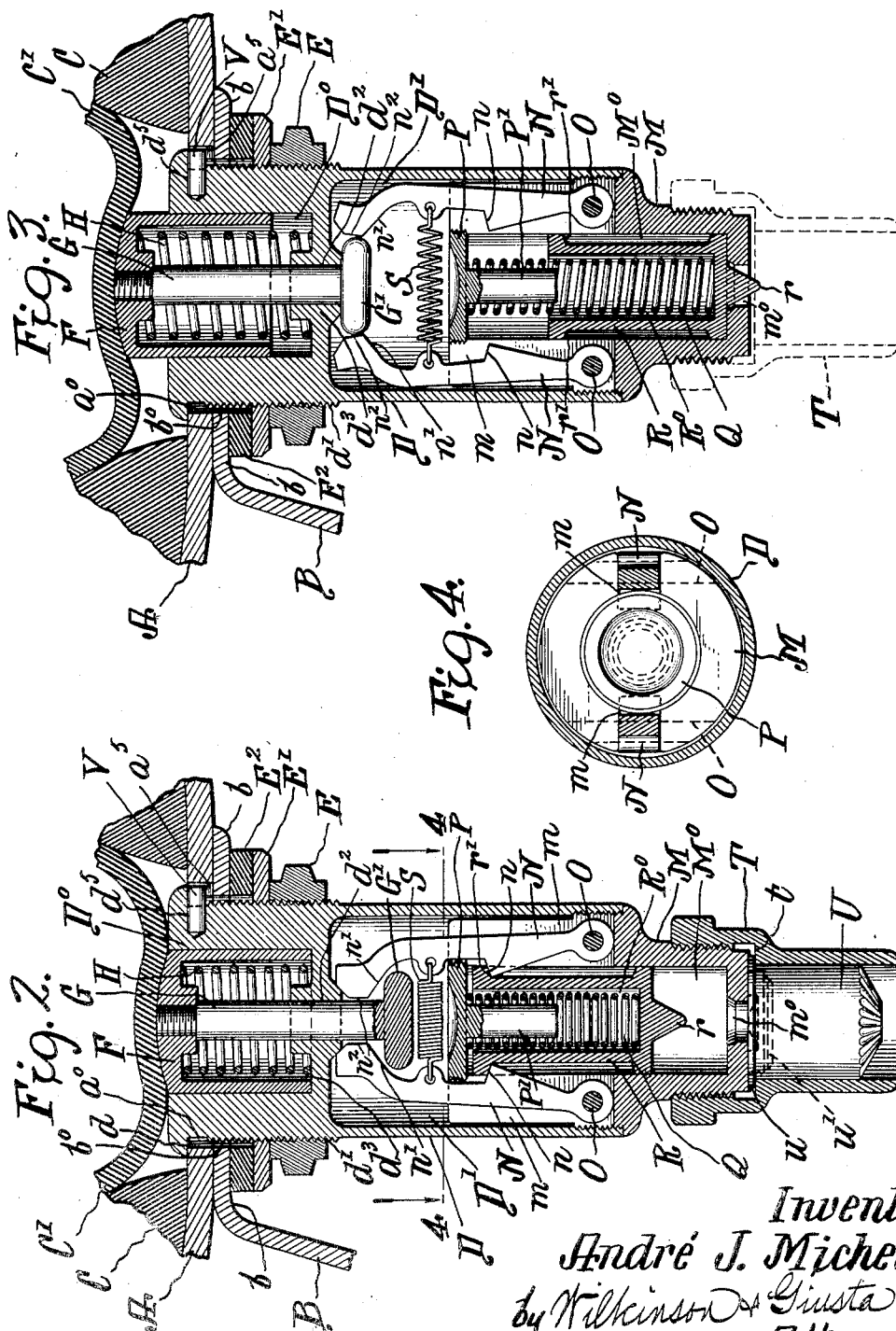

ANDRÉ JULES MICHELIN, OF PARIS, FRANCE.

AUTOMATIC ALARM FOR PARTIALLY-DEFLATED TIRES.

1,367,490.   Specification of Letters Patent.   Patented Feb. 1, 1921.

Application filed June 3, 1920. Serial No. 386,292.

*To all whom it may concern:*

Be it known that I, ANDRÉ JULES MICHELIN, a citizen of the French Republic, residing at Paris, France, have invented certain new and useful Improvements in Automatic Alarms for Partially-Deflated Tires; and I do hereby declare the following to be a full, clear, and exact description of the invention, such as will enable others skilled in the art to which it appertains to make and use the same.

My present invention relates to improvements in apparatus for warning the chauffeur or driver of a vehicle provided with pneumatic tires when the pressure of the air in the inner tube of said tire falls below normal, and prior to the complete deflation of the tire. In other words it is intended to provide automatically operated apparatus which will advise the chauffeur not when the tire is down, but when the pressure in the tire is so low as to threaten injurious effects at an early date but before such injurious effects take place.

In such an apparatus it is desirable to provide compact, light and efficient apparatus which is not likely to be in the way of the other parts of the mechanism, and which will not be conspicuous or interfere in any way with the esthetic appearance of the wheel to which it is attached. By the arrangement hereinafter described the automatic alarm attachment is made of generally similar shape and appearance to the valve casing and attachments used in charging the inner tube with compressed air, and by placing the attachment opposite the said valve casing, symmetry of parts is secured and the appearance of the wheel is in no way marred.

The invention relates primarily to an apparatus arranged to fire a cartridge, which is operated when the pressure in the inner tube falls below a predetermined limit.

My invention will be more fully understood after reference to the accompanying drawings, in which like parts are indicated by similar reference symbols throughout the several views, and in which:—

Figure 1 shows a cross section through the tire and the alarm apparatus through the adjacent portions of the rim and the disk carrying the rim, parts of the alarm apparatus being shown in elevation, and the alarm being shown in the cocked position which is that assumed when the tire is normally inflated up to working conditions.

Fig. 2 is a similar view to Fig. 1, but shows the parts on a larger scale.

Fig. 3 is a similar view to Fig. 2, but shows the parts of the alarm apparatus after the cartridge has been fired, the cartridge holder being indicated in dotted lines; and Fig. 4 shows a section along the line 4—4 of Fig. 2, and looking in the direction of the arrows.

A represents the rim carried by the wheel, which is shown of the clencher type, but may be made of any suitable or convenient type, and is mounted on the wheel in the usual way.

I have shown this rim mounted on the disk B of one of the well known metal disk wheels which is flanged as at $b$, and secured to the rim A in the usual well known way.

The tire C, mounted on the rim in the usual way, is provided with the inner tube C'. Suitable means, not shown, are provided for inflating this inner tube to the desired pressure.

The rim A and flanged portion $b$ of the disk B are provided with suitable perforations $a°$ and $b°$ for the insertion therethrough of the stock D, which is provided with a smooth head having an annular shoulder $d$ thereon adapted to engage the inner face of the rim. This stock is also provided with screw threads $d'$ to engage the nut E, which bears against the metal washer E' and the rubber gasket $E^2$, and when the nut E is set up the gasket $E^2$ is compressed and a secure joint is made which holds the stock in place and also prevents rattling. This stock is provided with a chamber $D°$ in its upper end, in which is mounted the cup-shaped cap F, in which is screwed the stem G having the rounded head G', which stem G passes through the opening $d^2$ in the wall $d^3$ of the stock D.

The cap F is normally pressed outward by means of the spring H, but is held pressed inward by the pneumatic pressure in the inner tube, as shown in Fig. 2, until said pressure falls, at which time the spring H tends to force the cap F outward, as indicated in Fig. 3.

In the chamber D' of the stock D a cap piece M is screwed, which is slotted as at $m$ to receive the hinged catches N which are pivoted to said cap piece by means of the pins O.

This cap piece M is provided with a hollow cylindrical chamber M° closed at its upper end by the screw plug P, which plug is preferably provided with a downwardly projecting guide stem P' which projects into the interior of the coil spring Q, which spring is mounted in the chamber R° of the firing plunger R.

This plunger has a firing point $r$ adapted to project down through the opening $m°$ in the end of the cap piece M when the cartridge is fired, as will be hereinafter described. The upper portion of the plunger R is provided with an annular rim $r'$ adapted to engage the shoulders $n$ of the catches N, which shoulders are normally held in engagement by means of the tension spring S. These two catches have wedge faces near their upper ends, as at $n'$, and above which are holding faces $n^2$ whose function will be hereinafter described.

Screwed on the lower end of the cap piece M is the carriage holder T, having an annular shoulder $t$ to engage the rim $u$ of the cartridge U, which cartridge may contain black gunpowder or other explosive, and is provided with a suitable primer $u'$, shown in dotted lines in Fig. 2, adapted to be struck by the firing point $r$ when the plunger is released. In order to hold the stock against turning as the various parts are screwed on, I may provide a lock pin V fitting in the notch $d^5$ in the stock D, and having its outer end projecting into a notch $a^5$ in the rim A, as shown in Figs. 2 and 3.

The operation of the device is as follows:—

Assuming the apparatus to be set to operate at a pressure of say two kilograms to the square centimeter, more or less, or approximately fourteen pounds to the inch, more or less, and assuming the pressure in the inner tube to be greater than this amount and the parts to be in the operative or cocked position as shown in Figs. 1 and 2, now suppose the pressure in the inner tube falls from any cause, as from a leak, below the safety limit just referred to. In the first condition, the air pressure will act against the spring impressed cap F and will hold the cap down to the position shown in Figs. 1 and 2. In the second condition, the pressure of the spring H will overcome the pressure of the compressed air in the inner tube, and the round head G' will be forced up the cam faces $n'$ of the catches N, spreading apart these catches against the action of the spring S and releasing the shoulders $n$ from engagement with the annular rib $r'$ on the firing plunger R. The two catches and the spring impressed cap will at that time assume the position shown in Fig. 3. As soon as the annular shoulder $r'$ of the firing plunger is released from the catches N, this plunger will fly inward under the action of the firing spring Q, causing the firing point $r$ to strike the primer $u'$ in the cartridge U and fire the cartridge. The unusual noise will at once attract the attention of the occupants of the car and warning will be given that one of the tires needs attention, and the chauffeur can get out and ascertain which of the four cartridges has been fired, and can thereby ascertain that that particular tire is not inflated up to the full desired working pressure.

After giving the tire the requisite attention, either by inflating it to the desired pressure, or by substituting another tire properly inflated, the fired cartridge may be removed, and the parts may be restored to the initial position by simply removing the cartridge holder T, as indicated in dotted lines in Fig. 4, and pushing the firing plunger R back to the initial position, which may be done with any suitable tool, or object, such as a nail, pencil or the like. When the head G' is in the position shown in Fig. 2, the spring S will tend to snap the shoulders $n$ of the catches N into engagement with the annular rib $r'$ on the firing plunger, and the firing plunger will then be held in the cocked position; now a fresh cartridge may be inserted in the cartridge holder T and the cartridge holder again secured in place.

While I have suggested a pressure of fourteen pounds to the square inch as a desirable lower limit for the working pressure in the tire, the apparatus may be readily adjusted and controlled by a higher or lower pressure, as by varying the strength or compression of the spring H.

It will be obvious that various changes might be made in the details of the apparatus herein described, and in the construction, combination and arrangement of parts which could be used without departing from the spirit of my invention; and I do not mean to limit the invention to such details except as particularly pointed out in the claim.

Having thus described my invention what I claim and desire to secure by Letters Patent of the United States is:—

An automatic alarm for indicating when the pressure in the inner tube of a pneumatic tire falls below a predetermined limit, comprising a hollow tubular stock projecting through the rim of the wheel, a cup-shaped cap slidably mounted in said stock, a spring normally pressing said cap outward against the action of the pneumatic pressure in the inner tube, a cartridge holder detachably connected to the opposite end of said stock from said cap and adapted to carry a cartridge, a spring impressed firing plunger provided with oppositely disposed engaging shoulders, and means controlled by the outward movement of said spring impressed cap for releasing said plunger and firing said cartridge when the pneumatic pressure in the inner tube falls below a predetermined limit, comprising a stem carried by said cap and provided with a rounded laterally projecting head, bent lever arms mounted in said stock and adapted to engage said head when said cap is pressed forward under the action of its spring, the said lever arms being provided with catches normally engaging said shoulders on the firing plunger, and a spring normally drawing said lever arms together, and holding said catches in engagement with said shoulders, but permitting said head to spread said arms and release said catches when said cap moves outward in said stock, substantially as described.

In testimony whereof, I affix my signature.

ANDRÉ JULES MICHELIN.